US011453149B2

(12) United States Patent
Cummings et al.

(10) Patent No.: US 11,453,149 B2
(45) Date of Patent: Sep. 27, 2022

(54) INJECTION MOLDABLE SILICONE COMPOSITION

(71) Applicant: Dow Silicones Corporation, Midland, MI (US)

(72) Inventors: Michelle R. Cummings, Midland, MI (US); Stanton Dent, Midland, MI (US); Joel P. McDonald, Midland, MI (US); Jacob Steinbrecher, Midland, MI (US); Michael Strong, Midland, MI (US); Bradley W. Tuft, Midland, MI (US); Clinton Whiteley, Wichita, KS (US)

(73) Assignee: Dow Silicones Corporation, Midland, MI (US)

( * ) Notice: Subject to any disclaimer, the term of this patent is extended or adjusted under 35 U.S.C. 154(b) by 397 days.

(21) Appl. No.: 16/623,958

(22) PCT Filed: Aug. 6, 2018

(86) PCT No.: PCT/US2018/045341
§ 371 (c)(1),
(2) Date: Dec. 18, 2019

(87) PCT Pub. No.: WO2019/040265
PCT Pub. Date: Feb. 28, 2019

(65) Prior Publication Data
US 2020/0139594 A1    May 7, 2020

Related U.S. Application Data

(60) Provisional application No. 62/549,661, filed on Aug. 24, 2017.

(51) Int. Cl.
C08G 77/20 (2006.01)
B29C 45/00 (2006.01)
C08G 77/08 (2006.01)
C08G 77/16 (2006.01)
C08G 77/18 (2006.01)
C08L 83/04 (2006.01)
B29K 83/00 (2006.01)
C08K 5/54 (2006.01)

(52) U.S. Cl.
CPC .......... *B29C 45/0001* (2013.01); *C08G 77/08* (2013.01); *C08G 77/16* (2013.01); *C08G 77/18* (2013.01); *C08G 77/20* (2013.01); *C08L 83/04* (2013.01); *B29K 2083/00* (2013.01); *C08K 5/54* (2013.01)

(58) Field of Classification Search
CPC ........ C08G 77/12; C08G 77/20; C08G 77/70; C08L 83/04; B29C 45/0001
See application file for complete search history.

(56) References Cited

U.S. PATENT DOCUMENTS

| | | |
|---|---|---|
| 3,159,601 A | 12/1964 | Ashby |
| 3,220,972 A | 11/1965 | Lamoreaux |
| 3,296,291 A | 1/1967 | Chalk et al. |
| 3,419,593 A | 12/1968 | Willing |
| 3,516,946 A | 6/1970 | Modic |
| 3,814,730 A | 6/1974 | Karstedt |
| 3,989,668 A | 11/1976 | Lee et al. |
| 4,472,470 A * | 9/1984 | Modic .................. C09D 183/04 428/447 |
| 4,766,176 A | 8/1988 | Lee et al. |
| 4,784,879 A | 11/1988 | Lee et al. |
| 5,017,654 A | 5/1991 | Togashi et al. |
| 5,036,117 A | 7/1991 | Chung et al. |
| 5,175,325 A | 12/1992 | Brown et al. |
| 2007/0244230 A1 * | 10/2007 | Sixt .................. C08L 83/04 528/31 |

FOREIGN PATENT DOCUMENTS

| | | |
|---|---|---|
| CN | 104448839 B | 2/2017 |
| EP | 0347895 B | 11/1993 |
| EP | 2845880 | 3/2015 |
| WO | 2017087351 | 5/2017 |

OTHER PUBLICATIONS

Freeman (Silicones, Published For The Plastics Institute, ILIFFE Books, Ltd., 1962)(p. 27).*

* cited by examiner

*Primary Examiner* — Kuo Liang Peng

(57) ABSTRACT

An injection moldable composition, comprising: A) a silicone resin (I) $[R^1_3SiO_{1/2}]_a[R^2R^3SiO_{2/2}]_b[SiO_{4/2}]_c$, wherein $R^1$, $R^2$, and $R^3$ are hydrocarbyl, hydrocarbyloxy, or hydroxyl, at least one of $R^2$ or $R^3$ is alkenyl, subscripts a, b, and c are each >0 and a+b+c=1, B) 0 to 90% (w/w), based on the weight of A) and B), of a silicone resin (II) $[R^4_3SiO_{1/2}]_d[SiO_{4/2}]_e$ wherein $R^4$ is hydrocarbyl, hydrocarbyloxy, or hydroxyl, at least one of $R^4$ is alkenyl, subscripts d and e are each >0, and d+e=1, C) a siloxane polymer having formula (III), $[R^5_3SiO_{1/2}]_f[R^6R^7SiO_{2/2}]_g$, wherein $R^{5-7}$ are hydrocarbyl or hydroxyl, at least one of $R^{5-7}$ is alkenyl, subscripts f and g are each >0, and f+g=1, D) a silicone crosslinker having at least two silicon-bonded hydrogen atoms per molecule, and E) a hydrosilylation catalyst, wherein the ratio of silicon-bonded hydrogen atoms to carbon-carbon double bonds is from 1.2 to 2.2.

8 Claims, No Drawings

INJECTION MOLDABLE SILICONE COMPOSITION

CROSS-REFERENCE TO RELATED APPLICATIONS

None.

FIELD OF THE INVENTION

The present invention relates generally to injection moldable compositions comprising organosiloxane resin and polymer having alkenyl groups, a silicone crosslinker having silicon-bonded hydrogen, and a hydrosilylation catalyst, where the ratio of silicon-bonded hydrogen atoms to carbon-carbon double bonds is from 1.2 to 2.2.

BACKGROUND OF THE INVENTION

Articles made from injection molding have continued to develop. As new articles are designed, new molds, materials, and molding processes must be developed to meet new challenges presented by these new designs. Material developed for new article designs include injection curable silicones. The silicones have been developed to produce articles with good physical properties, and the materials have the benefits of excellent stability against the weather, oxidation, and UV radiation.

Designers have been producing increasingly intricate article designs to meet application requirements. These intricate designs have exposed deficiencies in known injection curable silicone compositions. New intricate designed articles require complex molds with many cavities that must be filled. Known injection curable silicones may have issues with fully filling these cavities before curing begins, interfering with proper cavity filling and causing imperfections in the molded article. Imperfections in the molded article result in significant problems in some applications for the molded article. For example, significant distortion of light transmission can result from imperfections in optical applications, such as with molded automobile headlight lenses.

Known methods of modifying cure properties of injection curable silicone compositions have failings when used to delay cure to allow time to adequately fill cavities of a complex mold before the viscosity and modulus increase too significantly. For example, adding inhibitor or reducing catalyst load increases production cycle time due to, for example, longer hold times at the same temperature for evaporation or reaction of the inhibitor. Therefore, there exists a need for new injection moldable silicone compositions that allow for the modification of the cure induction time of injection moldable silicone compositions to allow injection molding to produce intricate articles using complex molds. Further, there is a need to be able to adjust the cure induction time of the composition through modification of percentages of the silicone components of the composition to adjust for changing complexities of mold designs.

BRIEF SUMMARY OF THE INVENTION

The present invention is directed to an injection moldable composition, comprising:
A) a silicone resin having an average formula (I)

$$[R^1{}_3SiO_{1/2}]_a[R^2R^3SiO_{2/2}]_b[SiO_{4/2}]_c, \quad (I)$$

wherein each $R^1$, $R^2$, and $R^3$ is independently hydrocarbyl having from 1 to 10 carbon atoms, hydrocarbyloxy having from 1 to 10 carbon atoms, or hydroxyl, and at least one of $R^2$ or $R^3$ is alkenyl, and subscripts a, b, and c are each >0 and a+b+c=1, B) 0 to 90% (w/w), based on the weight of A) and B), of a silicone resin having the average formula (II)

$$[R^4{}_3SiO_{1/2}]_d[SiO_{4/2}]_e, \quad (II)$$

wherein each $R^4$ is independently hydrocarbyl having from 1 to 10 carbon atoms, hydrocarbyloxy having from 1 to 10 carbon atoms, or hydroxyl, and at least one of $R^4$ is alkenyl, and subscripts d and e are each >0, and d+e=1, C) a siloxane polymer having an average formula (III)

$$[R^5{}_3SiO_{1/2}]_f[R^6R^7SiO_{2/2}]_g, \quad (III)$$

wherein each $R^{5-7}$ are independently hydrocarbyl having from 1 to 10 carbon atoms or hydroxyl, and at least one of $R^{5-7}$ is alkenyl, and subscripts f and g are each >0, and f+g=1

D) a silicone crosslinker having at least two silicon-bonded hydrogen atoms per molecule, and E) a hydrosilylation catalyst, wherein the ratio of silicon-bonded hydrogen atoms to carbon-carbon double bonds is from 1.2 to 2.2.

The present invention is further directed to a method of making the injection moldable silicone composition comprising combining the components of the injection moldable silicone composition, to a method of forming an injection molded silicone article comprising injection molding the injection moldable silicone composition, and to the injection molded article prepared by molding the injection moldable silicone composition.

The composition of the invention has delayed cure induction time allowing for more efficient filling of mold cavities of complex molds in injection molding processes, while also presenting a rapid cure completion following the delayed induction period, such that the combined effect enables good molding cycle times and less distortion and/or imperfections in articles prepared from the injection moldable silicone composition.

DETAILED DESCRIPTION OF THE INVENTION

An injection moldable composition, comprising:
A) a silicone resin having an average formula (I)

$$[R^1{}_3SiO_{1/2}]_a[R^2R^3SiO_{2/2}]_b[SiO_{4/2}]_c, \quad (I)$$

wherein each $R^1$, $R^2$, and $R^3$ is independently hydrocarbyl having from 1 to 10 carbon atoms, hydrocarbyloxy having from 1 to 10 carbon atoms, or hydroxyl, and at least one of $R^2$ or $R^3$ is alkenyl, and subscripts a, b, and c are each >0 and a+b+c=1, B) 0 to 90% (w/w), based on the weight of A) and B), of a silicone resin having the average formula (II)

$$[R^4{}_3SiO_{1/2}]_d[SiO_{4/2}]_e, \quad (II)$$

wherein each $R^4$ is independently hydrocarbyl having from 1 to 10 carbon atoms, hydrocarbyloxy having from 1 to 10 carbon atoms, or hydroxyl, and at least one of $R^4$ is alkenyl, and subscripts d and e are each >0, and d+e=1, C) a siloxane polymer having an average formula (III)

$$[R^5{}_3SiO_{1/2}]_f[R^6R^7SiO_{2/2}]_g, \quad (III)$$

wherein each $R^{5-7}$ are independently hydrocarbyl having from 1 to 10 carbon atoms or hydroxyl, and at least one of $R^{5-7}$ is alkenyl, and subscripts f and g are each >0, and f+g=1

D) a silicone crosslinker having at least two silicon-bonded hydrogen atoms per molecule, and E) a hydrosilylation catalyst, wherein the ratio of silicon-bonded hydrogen atoms to carbon-carbon double bonds is from 1.2 to 2.2.

The silicone resin A) has an average formula (I)

$$[R^1{}_3SiO_{1/2}]_a[R^2R^3SiO_{2/2}]_b[SiO_{4/2}]_c, \quad (I)$$

wherein each $R^1$, $R^2$, and $R^3$ is independently hydrocarbyl having from 1 to 10 carbon atoms, hydrocarbyloxy having from 1 to 10 carbon atoms, or hydroxyl, and at least one of $R^2$ or $R^3$ is alkenyl, and subscripts a, b, and c are each >0 and a+b+c=1.

Hydrocarbyl groups represented by $R^{1-3}$ typically have from 1 to 10, alternatively alternatively from 1 to 6 carbon atoms, alternatively from 1 to 4 carbon atoms, alternatively 1 carbon atom. Acyclic hydrocarbyl groups containing at least 3 carbon atoms can have a branched or unbranched structure. Examples of hydrocarbyl groups represented by $R^{1-3}$ include, but are not limited to, alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, hexyl, heptyl, octyl, nonyl, and decyl; cycloalkyl, such as cyclopentyl, cyclohexyl, and methylcyclohexyl; aryl, such as phenyl and naphthyl; alkaryl, such as tolyl and xylyl; aralkyl, such as benzyl and phenethyl; alkenyl, such as vinyl, allyl and propenyl, butenyl, hexenyl, and oxtenyl; arylalkenyl, such as styryl and cinnamyl; and alkynyl, such as ethynyl and propynyl.

Hydrocarbyloxy groups represented by $R^{1-3}$ have the formula —Oalk where O is oxygen and alk is alkyl having from 1 to 10 carbon atoms, alternatively from 1 to 6 carbon atoms, alternatively from 1 to 4 carbon atoms. Examples of alkyl groups represented by alk include, but are not limited to, those exemplified above for $R^{1-3}$. Examples of hydrocarbyloxy groups represented by $R^{1-3}$ include, but are not limited to, methoxy, ethoxy, propoxy, and butoxy.

At least one, alternatively at least 2, of $R^2$ or $R^3$ in (A) is alkenyl, alternatively $C_{1-6}$ alkenyl, alternatively $C_{1-4}$ alkenyl, alternatively ethenyl, propenyl, or butenyl.

The silicone resin (A) has carbon to carbon double bond, alternatively vinyl, content of about 0.10 to about 4.5 weight %, an OH content from silanol groups of about 0.2 to about 2.0 weight %, and a number average molecular weight of about 2,000 to about 25,000 g/mol. In one embodiment, (A) includes a vinyl content of about 0.5 to about 4.0 weight %, an OH content on silanol of about 0.4 to about 1.8 weight %, and a mass average molecular weight of about 2,000 to about 22,000 g/mol. In yet another embodiment, (A) includes a vinyl content of about 0.5 to about 3.5 weight %, an OH content due to silanol of about 0.6 to about 1.5 weight %, and a mass average molecular weight of about 3,000 to about 22,000 g/mol. One skilled in the art would know how to determine vinyl content, OH content, and mass average molecular weight.

In formula (I) of the silicone resin, the subscripts a, b, c, and d represent average numbers of each unit in the resin. The subscripts a, b, and c are each >0 and a+b+c=1. The subscript a has a value of from 0.001 to 0.9, alternatively 0.001 to 0.5. The subscript b has a value of from 0.001 to 0.9, alternatively 0.01 to 0.50, alternatively 0.28 to 0.37. The subscript c has a value of from 0.1 to 0.9, alternatively 0.2 to 0.85, alternatively 0.5 to 0.75.

The content of (A) in the injection moldable silicone composition is in the range from about 10 mass % to about 100 mass % of (A) or, more specifically, in an amount from about 50 mass % to about 99 mass % of (A) or, even more specifically, in an amount from about 75 mass % to about 95 mass % of (A), based on the weight of (A) and (B).

The silicone resin (B) comprises a silicone resin having the average formula (II)

$$[R^4{}_3SiO_{1/2}]_d[SiO_{4/2}]_e, \quad (II)$$

wherein each $R^4$ is independently hydrocarbyl having from 1 to 10 carbon atoms, hydrocarbyloxy having from 1 to 10 carbon atoms, or hydroxyl, and at least one of $R^4$ is alkenyl, and subscripts d and e are each >0, and d+e=1.

The hydrocarbyl and hydrocarbyloxy groups represented by $R^4$ are as described above for (A). At least one, alternatively at least two, of the groups represented by $R^4$ in (B) is alkenyl, alternatively $C_{1-6}$ alkenyl, alternatively ethenyl, propenyl, or butenyl, alternatively ethenyl or propenyl, alternatively ethenyl.

One skilled in the art would know how to make silicone resin (A).

In formula (II) of the silicone resin (B), the subscripts d and e represent average numbers of each unit in the resin. The subscripts d and e are each >0 and d+e=1. The subscript d has a value that is greater than 0, alternatively from 0.1 to 0.9, alternatively 0.1 to 0.5. The subscript e has a value greater than 0, alternatively from 0.1 to 0.9, alternatively 0.1 to 0.50.

The silicone resin (B) has a vinyl content of about 0.10 to about 4.5 weight %, an OH content due to silanol of about 0.2 to about 2.0 weight %, and a number average molecular weight of about 2,000 to about 25,000 g/mol. More specifically, (B) includes a vinyl content of about 0.5 to about 4.0 weight %, an OH content on silanol of about 0.4 to about 1.8 weight %, and a mass average molecular weight of about 2,000 to about 22,000 g/mol. Even more specifically, (B) includes a vinyl content of about 0.5 to about 3.5 weight %, an OH content due to silanol of about 0.6 to about 1.5 weight %, and a mass average molecular weight of about 3,000 to about 22,000 g/mol. One skilled in the art would know how to determine vinyl content, OH content and mass average molecular weight.

The content of (B) in the injection moldable silicone composition is in the range from about 0 mass % to about 90 mass % of (B) or, more specifically, in an amount from about 1 mass % to about 50 mass % of (A) or, even more specifically, in an amount from about 5 mass % to about 25 mass %, based on the weight of (A) and (B).

One skilled in the art would know how to make silicone resin (B).

The siloxane polymer (C) has an average formula (III)

$$[R^5{}_3SiO_{1/2}]_f[R^6R^7SiO_{2/2}]_g, \quad (III)$$

wherein each $R^{5-7}$ are independently hydrocarbyl having from 1 to 10 carbon atoms or hydroxyl, and at least one, alternatively at least two, of $R^{5-7}$ is alkenyl, subscripts f and g are each >0, and f+g=1.

The hydrocarbyl groups represented by $R^{5-7}$ are as defined for $R^{1-3}$ in formula (I). At least one of $R^{5-7}$ is alkenyl, alternatively $C_{1-10}$ alkenyl, alternatively $C_{1-6}$ alkenyl, alternatively ethenyl, propenyl, or butenyl, alternatively ethenyl. The position for this alkenyl on the siloxane polymer (B) may include, without limitation, the terminal position and/or a side chain (i.e., not in a terminal position) position, alternatively the terminal position, alternatively a side chain position, on the molecular chain.

In one example embodiment, (C) is an alkenyl-functional dialkylpolysiloxane with an average of at least two alkenyl groups in each molecule. In another example embodiment, (C) is a diorganopolysiloxane and may include, without limitation, dimethylpolysiloxanes end blocked at both molecular chain terminals by dimethylvinylsiloxy groups, dimethylsiloxane-methylvinylsiloxane copolymers end-blocked at both molecular chain terminals by dimethylvinylsiloxy groups, methylvinylpolysiloxanes endblocked at both molecular chain terminals by trimethylsiloxy groups, dim ethylsiloxane-methylvinylsiloxane copolymers end-blocked at both molecular chain terminals by trimethylsiloxy groups, or a combination of any two or more thereof.

In one example embodiment, the viscosity of (C) at 25° C. is from about 100 millipascal seconds (mPa·s) to about 2,000,000 mPa·s, alternatively from about 1,000 mPa·s to about 500,000 mPa·s. When (C) is a mixture of two or more alkenyl-functional polyorganosiloxanes which may include high and low viscosity alkenyl-functional polyorganosiloxanes, the viscosity of this mixture at 25° C. is from about 1,000 mPa·s to about 200,000 mPa·s. Viscosity is a well-known parameter in the silicones industry with silicones being sold by viscosity. Therefore, one skilled in the art would know how to determine the viscosity of a silicone material.

The content of (C) in the injection moldable silicone composition is in the range from about 30 mass % to about 80 mass % of (C) or, more specifically, in an amount from about 40 mass % to about 70 mass % of (C) or, even more specifically, in an amount from about 45 mass % to about 60 mass %, based on the weight of (A), (B), (C), and (D).

One skilled in the art would know how to make the siloxane polymer (C). Many polymers satisfying the requirements of (C) are sold commercially. As used herein, siloxane polymer and polysiloxane are synonymous.

The curable silicone composition of the invention further includes a silicone crosslinker (D) having at least two silicon-bonded hydrogen atoms per molecule. The silicone crosslinker (D) including, without limitation, an organohydrogenoligosiloxane, an organohydrogenpolysiloxane, a polyorganohydrogensiloxane, or a combination of any two or more thereof.

In one example embodiment, (D) is a combination of any two or more polyorganohydrogensiloxanes that differ in at least one of the following parameters: content of silicon hydride (SiH), molecular structure and composition (e.g. M ($R_3SiO_{1/2}$), D ($R_2SiO_{2/2}$), T ($RSiO_{3/2}$), Q ($SiO_{4/2}$) units and their ratio; pendant functional groups, architecture of molecules, branch of the side chains of polymer), viscosity, average molecular weight and molecular weight distribution, number of siloxane units and the sequence with two or more types of different siloxane units.

In another example embodiment, (D) is an SiH-functional organosiloxane crosslinker with an average per molecule of at least two silicon bonded hydrogen atoms and wherein (D) is selected from a single polyorganohydrogensiloxane, or a combination of two or more polyorganohydrogensiloxanes that differ in at least one of the following: structure, viscosity, average molecule weight, number of siloxane units and a sequence. SiH-functional means having a silicon-bonded hydrogen atom in the organosiloxane.

In one example embodiment, (D) is an organopolysiloxane having an average of at least three silicon-bonded hydrogen atoms in each molecule, wherein the silicon-bonded groups other than the silicon-bonded hydrogen are $C_{1-10}$ alkyl, in an amount that provides about 0.4 to about 4.0 moles silicon-bonded hydrogen in (D) per 1 mole of the total alkenyl in component (A), (B), and (C) combined. In this embodiment, (D) is an organopolysiloxane including: (D-1) an organopolysiloxane having at least about 0.7 mass % silicon-bonded hydrogen and comprising $SiO_{4/2}$ units and $HR^8_2SiO_{1/2}$ units in a ratio ranging from about 1.5 to about 3.8 moles of $HR^8_2SiO_{1/2}$ units per 1 mole of $SiO_{4/2}$ units, $R^8$ is $C_{1-10}$ alkyl, at about 5 mass % to about 100 mass % (about 5 mass % to about 95 mass %) of component (D); and (D-2) a straight chain organopolysiloxane having at least about 0.1 mass % silicon-bonded hydrogen, wherein the silicon-bonded groups other than the silicon-bonded hydrogen are $C_{1-10}$ alkyl, at 0 mass % to 50 mass % of component (D).

The content of (D) in the injection moldable silicone composition is in the range from about 1 mass % to about 20 mass % of (C) or, more specifically, in an amount from about 1 mass % to about 15 mass % of (C) or, even more specifically, in an amount from about 2 mass % to about 15 mass %, based on the weight of (A), (B), (C), and (D).

One skilled in the art is familiar with silicone crosslinkers like (D) and would know how to make a crosslinking compound of the invention. Many of the described crosslinkers (D) are available commercially.

As previously stated, the curable silicone composition of the invention further includes a hydrosilylation catalyst in a catalytic quantity providing a highly transparent cured silicone material (E). In one example embodiment, (E) is added in an amount sufficient to promote curing of the composition. (E) may include a hydrosilylation catalyst known in the art and commercially available. Suitable hydrosilylation catalysts include, without limitation, a platinum group metal which includes platinum, rhodium, ruthenium, palladium, osmium, or iridium metal or an organometallic compound thereof and a combination of any two or more thereof. In further embodiments, (E) is a hydrosilylation catalyst that includes platinum black, platinum compounds such as chloroplatinic acid, chloroplatinic acid hexahydrate, a reaction product of chloroplatinic acid and a monohydric alcohol, platinum bis(ethylacetoacetate), platinum bis(acetylacetonate), platinum dichloride, and complexes of the platinum compounds with olefins or low molecular weight organopolysiloxanes or platinum compounds microencapsulated in a matrix or core-shell type structure.

In one example embodiment, (E) is a hydrosilylation catalyst solution that includes complexes of platinum with low molecular weight organopolysiloxanes that include 1,3-diethenyl-1,1,3,3-tetramethyldisiloxane complexes with platinum. These complexes may be microencapsulated in a resin matrix. In an alternative example embodiment, the catalyst includes 1,3-diethenyl-1,1,3,3-tetramethyldisiloxane complex with platinum.

Examples of suitable hydrosilylation catalysts for (E) are described in, for example, U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B. Microencapsulated hydrosilylation catalysts and methods of preparing them are exemplified in U.S. Pat. Nos. 4,766,176; and 5,017,654. In another embodiment, the platinum catalyst is provided in a solution with vinyl functional organopolysiloxanes at concentrations of about 100 to about 100,000 ppm, such that when diluted in the final formulation, the total concentration is between about 0.1 and about 100 ppm.

The content of (E) in the injection moldable silicone composition is in a hydrosilylation catalytic effective amount, alternatively a range from about 0.01 ppm to 5 mass %, alternatively about 1 ppm to a 1 mass %, alternatively from 1 ppm to 100 ppm, based on the weight of (A), (B), (C), and (D).

In one embodiment, the injection moldable silicone composition comprises an inhibitor to hydrosilylation (F). For example, (F) is a reaction inhibitor in order to adjust the cure rate of the curable silicone composition. In one embodiment, (F) includes, without limitation, an alkyne alcohol such as 2-methyl-3-butyn-2-ol, 3,5-dimethyl-1-hexyn-3-ol, 1-ethynyl-1-cyclohexanol, phenylbutynol or a combination of any two or more thereof; ene-yne compounds such as 3-methyl-3-pentcen-1-yne, or 3,5-dimethyl-3-hexen-1-yne, for example; as well as 1,3,5,7-tetramethyl-1,3,5,7-tetravinyl-cyclotetrasiloxane, 1,3,5,7-tetramethyl-1,3,5,7-tetrahexenylcyclotetrasiloxane, or benzotriazole, for example. There is no limitation on the content of this reaction inhibitor in the curable silicone composition, and this content may be selected as appropriate as a function of the molding method and curing conditions. In one embodiment, (F) is present in an amount based on a total weight of the curable silicone composition of about 10 parts per million (ppm) to about 10,000 parts per million (ppm), and more specifically from about 100 ppm to about 5,000 ppm.

Optionally, the injection moldable silicone composition may further include one or more additional ingredients (G). The additional ingredient or combination of ingredients (G) may include, for example, an hydrosilylation reaction inhibitor, a mold release agent, a filler, an adhesion promoter, a heat stabilizer, a flame retardant, a reactive diluent, an oxidation inhibitor, or a combination of any two or more thereof.

The ratio of silicon-bonded hydrogen to carbon-carbon double bonds in the injection moldable silicone composition is from 0.5 to 4, alternatively from 1 to 3, alternatively from 1.2 to 2.5, alternatively from 1.3 to 2.0, alternatively 1.4 to 1.9, based on the silicon-bonded hydrogen bonds from (D), and the carbon-carbon double bonds from (A), (B), and (C).

In one embodiment, the induction time of the injection moldable silicone composition is tunable or modifyable by adjusting the ratios of (A), (B), and (C) within the specified ranges.

In certain embodiments, the method further includes heating the injection moldable silicone composition to form a cured product. The heating step may further include, for example, injection molding, transfer molding, casting, extrusion, overmolding, compression molding, and cavity molding and the cured product is a molded, cast, or extruded article including lenses, light guides, optically clear adhesive layer, or other optical elements.

Optical device components may be produced using the injection moldable silicone composition as described herein by a method including shaping the injection moldable silicone composition and curing the injection moldable silicone composition to form a cured product, for example, for use in an optical device. Shaping the injection moldable silicone composition may be performed by injection molding, transfer molding, casting, extrusion, overmolding, compression molding, or cavity molding to produce a molded, cast, potted, dispensed, or extruded article. The method of shaping the injection moldable silicone composition will depend on various factors including a size and/or a shape of the optical device to be produced and the composition selected.

In one embodiment, the cured injection moldable silicone composition can be used in an electronic or optical device application. The electronic or optical device can be a charged coupled device, a light emitting diode, a lightguide, an optical camera, a photo-coupler, or a waveguide, for example. In another embodiment, the cured injection moldable silicone composition can be used in an optical device to facilitate evenly illuminating a surface of the optical device from which light is extracted.

In one embodiment, a highly transparent, cured silicone product is formed by curing the injection moldable silicone composition. In another embodiment, the highly transparent, cured silicone product is a molded, cast or extruded article. In yet another embodiment, the highly transparent cured silicone product includes a substrate that forms a single article with a cured silicone layer.

In another embodiment, the injection moldable silicone composition may be applied to optical parts, including, without limitation, lens, reflectors, sheets, films, bars and tubings by any fabrication method. The injection moldable silicone composition may be used for electronics, displays, soft lithography, and medical and healthcare devices. In one embodiment, the injection moldable silicone composition is used as a diffuser of light or to provide a diffuse effect.

The present invention allows for the induction time to be tuned based on the need and complexity of the mold used in the injection molding process. Induction time is tuned by increasing or decreasing induction time within desired parameters allowing for all mold cavities to be filled before viscosity and the modulus increase to obstruct cavity filling, while cycle times are maintained.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention. All percentages are in wt. % unless otherwise noted.

TABLE 1

List of abbreviations used in the examples.

| Abbreviation | Word |
|---|---|
| G | gram |
| Me | methyl |
| wt | weight |
| % | percent |
| mol | mole |
| Hr | hour |
| ° C. | degrees Celsius |
| NA | Not Applicable |
| mL | milliliters |
| Solids Content | (wt. of dried sample/wt. of initial sample) × 100 and determined as described below |
| Cm | Centimeter |
| dNm | deciNewton-meter |
| Sec | Second |
| mPa | Millipascals |
| Ppm | Parts per million |

Test Procedures

The cure rheology was measured according to ASTM D5289 at 150° C. for 3 minutes. The following data was obtained:

TS1 (sec): time required to achieve 1 dNm

Torque @ 30 seconds: the torque (dNm) at 30 seconds

Peak Rate (torque/min): the highest achieved rate (dNm/sec) within the 3 minute testing time.

The nature and designation of the materials used in the following examples for components (A)-(C) and the reaction inhibitor as a cure retarder are as indicated below.

Component A a-1: an organopolysiloxane given by the average unit formula $(Me_3SiO_{1/2})_{0.42}(ViMeSiO_{2/2})_{0.05}(SiO_{4/2})_{0.53}$, that has a number-average molecular weight (Mn) of approximately 4,500, a vinyl group content of approximately 1.6 mass %.

Component B b-1: an organopolysiloxane given by the average unit formula $(Me_3SiO_{1/2})_{0.40}(ViMe_2SiO_{1/2})_{0.05}(SiO_{4/2})_{0.55}$, that has a number-average molecular weight (Mn) of approximately 5,200, a vinyl group content of approximately 1.9 mass %.

Component C c-1: a dimethylpolysiloxane endblocked by dimethylvinylsiloxy groups at both molecular chain terminals, that has a viscosity of approximately 2,000 mPa·s.

c-2: a dimethylpolysiloxane endblocked by dimethylvinylsiloxy groups at both molecular chain terminals, that has a viscosity of approximately 5,000 mPa·s.

c-3: a dimethylpolysiloxane endblocked by dimethylvinylsiloxy groups at both molecular chain terminals, that has a viscosity of 40,000 mPa·s.

Component D d-1: an organopolysiloxane given by the average unit formula $(HMe_2SiO_{1/2})_8((SiO_{4/2})_3$, that has a kinematic viscosity of 23 mm²/s and a silicon-bonded hydrogen atom content of approximately 0.96 mass %.

Component E e-1 Platinum catalyst: a 1,3-divinyltetramethyldisiloxane solution of a 1,3-divinyltetramethyldisiloxane complex of platinum. The platinum metal content is approximately 5200 ppm.

Component F: Reaction Inhibitor as a Cure Retarder f-1: 3,5-dimethyl-1-octyn-3-ol.

Examples 1-5; Comparative Examples 1-3

The formulations of the examples and comparative examples were prepared by the following procedure. The alkenyl-functional polydimethylsiloxane C and the solvated alkenyl functional silicone resins A and/or B were pre-blended and then stripped of solvent at reduced pressure and elevated temperature to remove all the solvent from the resin/polymer blend. The alkenyl-functional polydimethylsiloxane C, alkenyl-functional silicone resin A and/or B blend, the hydrosilylation catalyst E, hydrogen functional cross-linker D, and hydrosilylation inhibitor F were added to a common vessel and mixed on a planetary mixer (Hauschild SpeedMixer DAZ 150FVZ) at 3,540 rotations per minute (rpm) for 25 seconds.

The formulations were tested as described above in the test procedures sections. The results show the delayed inductance time for compositions according to the invention. The formulations and results are listed in Table 2.

TABLE 2

Formulations of the Examples and Comparative Examples and test results.

| Component | Comparative example #1 | Comparative example #2 | Comparative example #3 | Example #1 | Example #2 | Example #3 | Example #4 | Example #5 |
|---|---|---|---|---|---|---|---|---|
| c-2 | 41.64 | | | | | | | |
| c-3 | 13.91 | | 18.00 | | 6.48 | 14.4 | 18.00 | 4.32 |
| c-1 | | 62.69 | 46.32 | 56.21 | 50.94 | 44.49 | 41.56 | 51.48 |
| b-1 | 39.59 | 32.29 | 30.86 | | 2.52 | 5.6 | 7.00 | 1.68 |
| a-1 | | | | 37.47 | 33.96 | 29.66 | 27.71 | 34.32 |
| d-1 | 4.6 | 4.24 | 4.03 | 5.62 | 5.40 | 5.15 | 5.03 | 7.50 |
| e-1 | 0.06 | 0.06 | 0.06 | 0.06 | 0.06 | 0.06 | 0.06 | 0.06 |
| f-1 | 0.2 | 0.1 | 0.1 | 0.1 | 0.1 | 0.1 | 0.1 | 0.1 |
| SiH:Vi Ratio | 1.4 | 1.5 | 1.5 | 1.5 | 1.5 | 1.5 | 1.5 | 2.1 |
| Catalyst ppm | 3.1 | 3.0 | 3.0 | 3.1 | 3.1 | 3.1 | 3.1 | 3.1 |
| TS1 (sec) | 11.6 | 10.6 | 11.13 | 14.1 | 14.4 | 14.0 | 12.3 | 12.0 |
| Torque @30 s (dNm) | 10.7 | 11.4 | 11.2 | 13.5 | 13.0 | 13.0 | 12.9 | 31.8 |
| Peak rate (torque/sec) | 54.1 | 62.6 | 62.3 | 61.0 | 60.8 | 61.6 | 57.9 | 156.3 |

That which is claimed is:

1. An injection moldable silicone composition, comprising:

A) a silicone resin having an average formula (I)

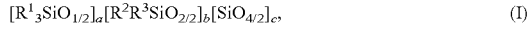

wherein each $R^1$, $R^2$, and $R^3$ is independently hydrocarbyl having from 1 to 10 carbon atoms, hydrocarbyloxy having from 1 to 10 carbon atoms, or hydroxyl, and at least one of $R^2$ or $R^3$ is alkenyl, and subscripts a, b, and c are each >0 and a+b+c=1, B) 0 to 90% (w/w), based on the weight of A) and B), of a silicone resin having the average formula (II)

wherein each $R^4$ is independently hydrocarbyl having from 1 to 10 carbon atoms, hydrocarbyloxy having from 1 to 10 carbon atoms, or hydroxyl, and at least one of $R^4$ is alkenyl, and subscripts d and e are each >0, and d+e=1, C) a siloxane polymer having an average formula (III)

wherein each $R^{5-7}$ are independently hydrocarbyl having from 1 to 10 carbon atoms or hydroxyl, and at least one of $R^{5-7}$ is alkenyl, and subscripts f and g are each >0, and f+g=1

D) a silicone crosslinker having at least two silicon-bonded hydrogen atoms per molecule wherein the crosslinker is according to formula (IV)

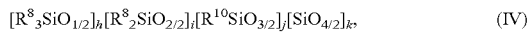

wherein each $R^8$ is independently hydrocarbyl or hydrogen, each $R^9$ is independently hydrocarbyl having from 1 to 10 carbon atoms, each $R^{10}$ is independently hydrocarbyloxy or hydroxyl, subscripts $h+i+j+k=1$, $h>0$, $k>0$, $i\geq 0$, $j\geq 0$, and E) a hydrosilylation catalyst, wherein the ratio of silicon-bonded hydrogen atoms to carbon-carbon double bonds is from 1.2 to 2.2.

2. A composition according to claim 1, further comprising an inhibitor.

3. A composition according to claim 2, wherein the inhibitor is a branched, unsaturated alcohol having from 4 to 10 carbon atoms.

4. A composition according to claim 1, wherein each $R^1$ is independently methyl or hydroxyl, each $R^2$ is independently vinyl or methyl, each $R^3$ is methyl, each $R^4$ is independently vinyl or hydroxyl, and each $R^5$ is independently vinyl, methyl, or hydroxyl, and wherein the ratio of silicon-boned hydrogen atoms to carbon-carbon double bonds is from 1.5 to 2.2.

5. A composition according to claim 1, wherein $R^8$ represents two methyl groups and hydrogen, subscripts $j=0$ and $i=0$.

6. A composition according to claim 1, wherein the hydrosilylation catalyst comprises a compound of platinum.

7. A method for injection molding a composition, the method comprising:

injecting an injection moldable silicone composition comprising

A) a silicone resin having an average formula (I)

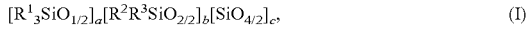

$$[R^1_3SiO_{1/2}]_a[R^2R^3SiO_{2/2}]_b[SiO_{4/2}]_c, \quad (I)$$

wherein each $R^1$, $R^2$, and $R^3$ is independently hydrocarbyl having from 1 to 10 carbon atoms, hydrocarbyloxy having from 1 to 10 carbon atoms, or hydroxyl, and at least one of $R^2$ or $R^3$ is alkenyl, and subscripts a, b, and c are each $>0$ and $a+b+c=1$, B) 0 to 90% (w/w), based on the weight of A) and B), of a silicone resin having the average formula (II)

$$[R^4_3SiO_{1/2}]_d[SiO_{4/2}]_e, \quad (II)$$

wherein each $R^4$ is independently hydrocarbyl having from 1 to 10 carbon atoms, hydrocarbyloxy having from 1 to 10 carbon atoms, or hydroxyl, and at least one of $R^4$ is alkenyl, and subscripts d and e are each $>0$, and $d+e=1$, C) a siloxane polymer having an average formula (III)

$$[R^5_3SiO_{1/2}]_f[R^6R^7SiO_{2/2}]_g, \quad (III)$$

wherein each $R^{5-7}$ are independently hydrocarbyl having from 1 to 10 carbon atoms or hydroxyl, and at least one of $R^{5-7}$ is alkenyl, and subscripts f and g are each $>0$, and $f+g=1$ D) a silicone crosslinker having at least two silicon-bonded hydrogen atoms per molecule, and E) a hydrosilylation catalyst, into a mold and subjecting the injected moldable composition to conditions sufficient to cure the injected moldable composition.

8. An injection molded article comprising:

an article produced by injection molding an injection moldable silicone composition comprising A) a silicone resin having an average formula (I)

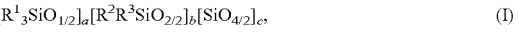

$$[R^1_3SiO_{1/2}]_a[R^2R^3SiO_{2/2}]_b[SiO_{4/2}]_c, \quad (I)$$

wherein each $R^1$, $R^2$, and $R^3$ is independently hydrocarbyl having from 1 to 10 carbon atoms, hydrocarbyloxy having from 1 to 10 carbon atoms, or hydroxyl, and at least one of $R^2$ or $R^3$ is alkenyl, and subscripts a, b, and c are each $>0$ and $a+b+c=1$, B) 0 to 90% (w/w), based on the weight of A) and B), of a silicone resin having the average formula (II)

$$[R^4_3SiO_{1/2}]_d[SiO_{4/2}]_e, \quad (II)$$

wherein each $R^4$ is independently hydrocarbyl having from 1 to 10 carbon atoms, hydrocarbyloxy having from 1 to 10 carbon atoms, or hydroxyl, and at least one of $R^4$ is alkenyl, and subscripts d and e are each $>0$, and $d+e=1$, C) a siloxane polymer having an average formula (III)

$$[R^5_3SiO_{1/2}]_f[R^6R^7SiO_{2/2}]_g, \quad (III)$$

wherein each $R^{5-7}$ are independently hydrocarbyl having from 1 to 10 carbon atoms or hydroxyl, and at least one of $R^{5-7}$ is alkenyl, and subscripts f and g are each $>0$, and $f+g=1$ D) a silicone crosslinker having at least two silicon-bonded hydrogen atoms per molecule, and E) a hydrosilylation catalyst.

* * * * *